United States Patent Office 3,623,209
Patented Nov. 30, 1971

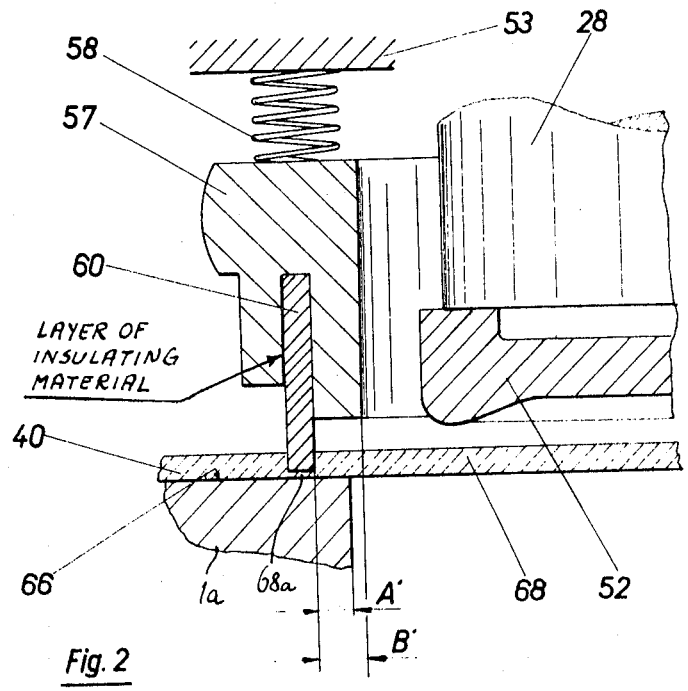
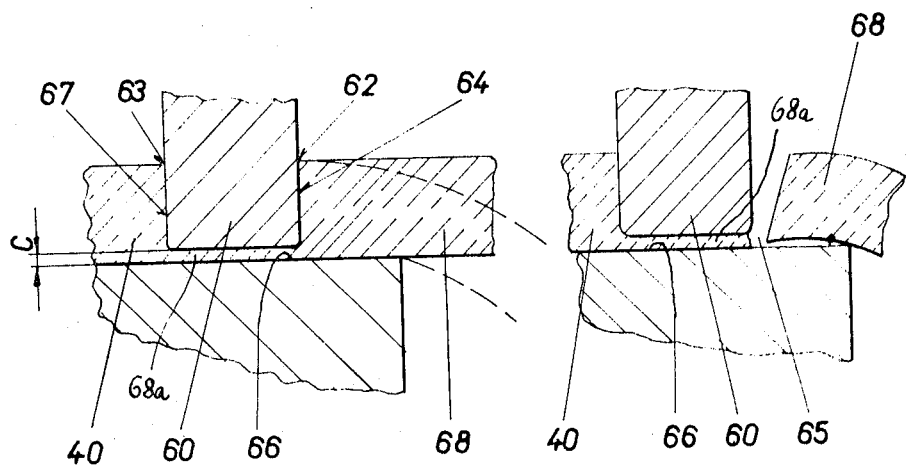

3,623,209
METHOD FOR SEPARATING BLANKS FROM PLASTIC SHEETS
Gerhard Zühlke, Geroldswil, and Paul Brändli and Max Spälti, Zurich, Switzerland, assignors to Zuhlke & Brandli AG, Zurich, Switzerland
Filed Apr. 25, 1969, Ser. No. 819,404
Claims priority, application Switzerland, Aug. 14, 1968, 12,230/68; Nov. 5, 1968, 16,434/68
Int. Cl. B23p 17/00
U.S. Cl. 20—413     4 Claims

ABSTRACT OF THE DISCLOSURE

Mirrors for use by dentists or for similar purposes are produced by clamping a blank of strongly light-reflecting synthetic thermoplastic material between annular male and female mirror frame portions. Such clamping step is carried out simultaneously with separation of the blank from a web of sheet material which is maintained in flattened and stretched condition and is weakened in the zone around the blank by a welding electrode which softens the material of the web and penetrates into the thus softened material by being biased toward a supporting surface located opposite the electrode. The male mirror frame portion serves as a means for tearing the blank from the weakened zone and for simultaneously moving the marginal portion of the thus separated blank against the internal surface of the female mirror frame portion.

BACKGROUND OF THE INVENTION

The present invention relates to a method and apparatus for separating blanks from sheets or webs of flexible material, particularly for separating substantially circular or disk-shaped blanks from sheets of strongly light-reflecting synthetic thermoplastic material. Such blanks can be used in small mirrors, particularly in those which are employed by a dentist in the mouth of a patient. The invention also relates to mirrors which are produced by utilizing the thus obtained blanks.

It is already known to employ blanks of foil or plastic sheet stock in mirrors for use by dentists or for analogous purposes, especially as a light-reflecting means in relatively small mirrors which are mounted in a circular frame at one end of a handle so that the dentist or the physician can readily manipulate the mirror during introduction of the reflecting surface into the mouth of a patient. As a rule, the blanks are separated from a relatively large sheet of light-reflecting material by resorting to stamping or punching tools. The sheet is placed onto a flat elastic support and the sharp cutting edge of the punching or stamping tool is moved toward the support to thereby separate a blank from the flattened sheet. The useful life of the elastic support is very short and the cutting edges of tools must be sharpened or replaced at frequent intervals. Furthermore, the freshly separated blank must be picked up and inserted into a suitable holder for clamping between the portions of a mirror frame. Such positioning and orientation of the blank consumes much time and contributes significantly to the cost of the ultimate product.

It was already proposed to clamp the sheet in the region around the cutting edge while the stamping tool moves against the support or to clamp the blank within the confines of the cutting edge so that the freshly separated blank can be more readily manipulated during insertion between the portions of a mirror frame. A drawback of such procedure is that the severing of blanks entails considerable losses in sheet material and that the blank must be trimmed subsequent to clamping in a mirror frame. The trimming operation must be performed by skilled persons and by resorting to complicated and expensive equipment.

SUMMARY OF THE INVENTION

An object of the invention is to provide a novel and improved method of separating blanks from sheet material, particularly for separating relatively small blanks from light-reflecting synthetic plastic, sheet material, in such a way that the losses in material are reduced to a minimum and that the separated blank is in an optimum position for further processing.

Another object of the invntion is to provide a product which embodies the blank.

A further object of the invention is to provide an apparatus which can be utilized for carrying out the above outlined method and to construct the apparatus in such a way that the separation of successive blanks does not result in dulling of cutting edges, in wear on movable or stationary parts and/or in improper orientation of freshly formed blanks.

An additional object of the invention is to provide an apparatus wherein the separation of blanks from a sheet of thermoplastic material takes place simultaneously with further processing of the blank, preferably simultaneously with introduction of the blank between the portions of a mirror frame.

Still another object of the invention is to provide an apparatus which can be used for automatic production of blanks in rapid sequence and with a high degree of reproducibility so that the size and orientation of each of a series of successively obtained blanks is the same as that of the preceding blank or blanks.

A concomitant object of the invention is to provide an apparatus which can produce small mirrors for use by dentists or for similar purposes and wherein the light-reflecting portions of the mirrors are formed, manipulated and installed in mirror frames in a series of rapidly following steps.

One feature of our invention resides in the provision of a method of separating blanks from sheets, particularly for separating substantially disk-shaped (circular) blanks from sheets of strongly light-reflecting synthetic thermoplastic material. The method comprises the steps of flattening and stretching a sheet whose dimensions exceed the dimensions of the desired blank (such sheet may constitute a portion of a web which is being intermittently withdrawn from a reel or from an analogous source of convoluted sheet material), weakening the thus flattened and tensioned sheet in a zone along the outline of the desired blank, and tearing the part within the weakened zone away from the remainder of the sheet so that the thus separated part constitutes a blank.

The weakening step preferably comprises heating the aforementioned zone of the tensioned sheet, most preferably with simultaneous application of pressure to reduce the thickness of the plasticized zone. Such heating and pressure applying steps are preferably effected by resorting to a substantially ring-shaped welding electrode. The method preferably further comprises the step of cooling the weakened zone prior to tearing so that the zone adheres to the electrode during tearing. During such tearing, the weakened zone is preferably mechanically clamped between the electrode and the surface of a stationary support. The tearing step preferably comprises separating the blank from the weakened zone in response to application of a uniform pressure to the part within the weakened zone in a direction at right angles to the plane of the tensioned sheet. Such tearing step is preferably carried out simultaneously or substantially simultaneously with clamping of the marginal portion of the blank between two complementary annular surfaces which can be provided on two frame portions forming part of a dentist's mirror or the like.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is an enlarged vertical sectional view of a detail in the apparatus of FIG. 1, showing that stage of a blank formation when the electrode has completed the weakening of the zone around a blank;

FIG. 3 is an enlarged vertical sectional view of a detail of the structure shown in FIG. 2, a freshly formed blank being indicated by phantom lines during the initial stage of separation from the remainder of a synthetic thermoplastic sheet;

FIG. 4 illustrates the final stage of separation of a freshly formed blank;

DESCRIPTION OF THE PREFERRED EMBODIMENTS

Figure 1:
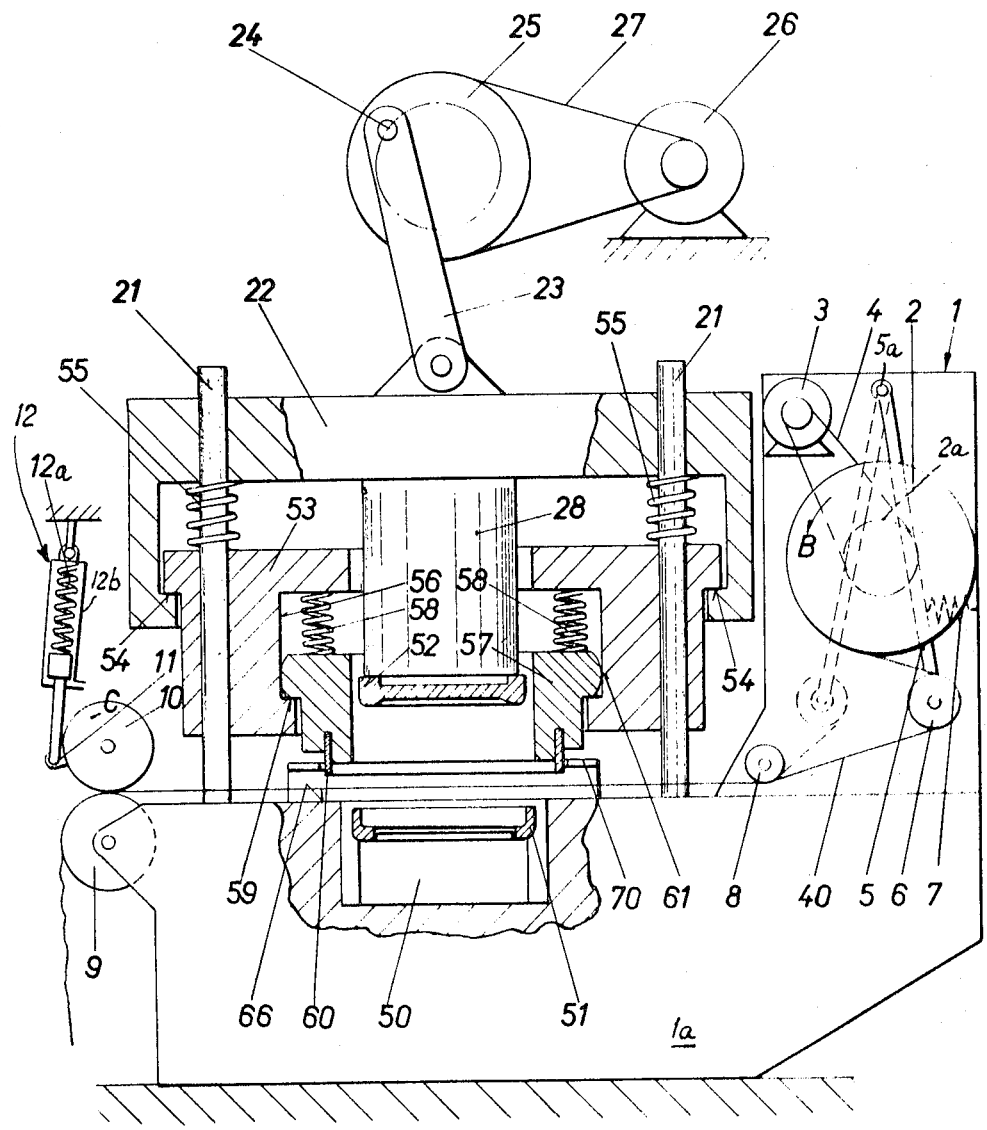
FIG. 1 is a schematic partly elevational and partly sectional view of an apparatus which embodies one form of the present invention.

The apparatus which is shown in FIG. 1 comprises a housing or main support 1 which carries a source of supply of convoluted sheet material here shown as a reel 2 which is rotatable about a horizontal axis. The reel 2 can be rotated in a direction (arrow B) to pay out the web or sheet 40 by an electric motor 3 which is mounted on the housing 1 and drives a pulley 2a on the core of the reel 2 by way of an endless belt 4. The sheet 40 consists of synthetic plastic material and is strongly light-reflecting so that its surfaces can be used as mirror surfaces. The housing 1 further supports a horizontal pivot 5a for an elongated lever 5 which carries at its lower end a tensioning roll 6 for the sheet 40. The pivot 5a is located at a level above the axis of the reel 2 and the lever 5 is biased in a counterclockwise direction, as viewed in FIG. 1, by a helical spring 7 one end of which is secured to the housing 1. The sheet 40 passes over a guide roll 8 and into the nip of two intermittently driven advancing rolls 9, 10. The path along which the sheet 40 moves between the guide roll 8 and advancing rolls 9, 10 is horizontal and is parallel to the top surface 66 of a base plate 1a which forms part of the housing 1 and supports the shafts of the advancing rolls 9, 10. The latter is rotatable stepwise in a clockwise direction (arrow C) by a drive which includes a radial arm 11 and a single-acting fluid operated cylinder and piston unit 12. The arrangement is such that the arm 11 rotates the advancing roll 10 only when it turns in a clockwise direction but not when it rotates in the counterclockwise direction under the action of the spring 12a in the cylinder 12b of the unit 12. The strokes of the unit 12 are selected in such a way that the sheet 40 is advanced stepwise and always through a distance of predetermined length which suffices to permit the formation of a blank 68 (see FIGS. 2-4). The tensioning roll 6 and spring 7 insure that the sheet 40 is flattened and is held under tension in the region between the guide roll 8 and advancing rolls 9, 10.

The top surface 66 of the base plate 1a of the housing 1 is provided with a recess for a holder or anvil 50 which carries the annular female portion 51 of a mirror frame. The positioning of the holder 50 is such that the upper edge face of the female frame portion 51 thereon is located slightly below the level of and is parallel with the surface 66, i.e., parallel with the plane of that portion of the sheet 40 which extends between the guide roll 8 and advancing rolls 9, 10.

The base plate 1a carries two upstanding vertical guide members or tie rods 21 which are located at diametrically opposite sides of the holder 50 and serve to guide a vertically reciprocable outer carrier or yoke 22. The means for moving the yoke 22 toward and away from the holder 50 comprises a link 23 which is connected to an eccentric pin 24 of a disk 25 driven by an electric motor 26 by way of an endless belt 27. The central portion of the yoke 22 supports a downwardly extending second holder or ram 28 which detachably supports an annular male mirror frame portion 52 in axial alignment with the female mirror frame portion 51 on the lower holder 50. The tie rods 21 further guide a second or intermediate reciprocable carrier 53 having an external annular shoulder 54 which is biased against a complementary internal shoulder of the yoke 22 by helical sprngs 55 surrounding the tie rods in the space between the parts 22, 53. The intermediate carrier 53 defines an internal chamber or bore 56 which accommodates an annular flange 61 of a third or inner carrier 57. Helical springs 58 in the bore 56 bias the carrier 57 downwardly so that its external annular shoulder 59 normally abuts against a complementary internal shoulder of the intermediate carrier 53. The lower end face of the inner carrier 57 is provided with an annular recess for a portion of a ring-shaped weakening electrode 60 which also serves as a means for facilitating separation of a blank 68 from the sheet 40. The bias of the springs 58 is selected in such a way that the pressure which the electrode 60 exerts upon the sheet 40 cannot exceed a predetermined value. The springs 55 insure that the intermediate carrier 53 shares the initial downward movement of the yoke 22 and that the yoke can thereupon move with reference to the carrier 53 in order to introduce the male mirror frame portion 52 into the female mirror frame portion 51 and to simultaneously clamp a freshly formed blank 68 between the frame portion 51, 52. The annular flange 61 of the inner carrier 57 is formed with a convex external surface (see particularly FIG. 2) to insure that the carrier 57 can be tilted with reference to the carrier 53 so that the lower edge surface of the electrode 60 can move into full surface-to-surface abutment with the adjoining ring-shaped zone 68a of the sheet 40 and presses such zone of the sheet against the top surface 66. In cooperation with the springs 58, the flange 61 insures that each portion of the electrode 60 exerts upon the adjoining portions of the sheet 40 the same force when the yoke 22 is caused to perform a downward stroke.

FIG. 2 illustrates in greater detail a portion of the structure shown in FIG. 1 and during that stage of the formation of a blank 68 when the electrode 60 dwells in its lower end position and penetrates into the plasticized material of the adjoining zone 68a of the sheet 40. The electrode 60 is heated, at least during that stage of a cycle when it engages the sheet 40, so that the zone 68a becomes plasticized and permits penetration of the electrode into the thus plasticized material. A layer of insulating material (indicated by a legend) is provided between the electrode 60 and the adjoining portion of the inner carrier 57; this layer insures satisfactory insulation up to a potential of about 100 volts and at a temperature of up to 500° C. The insulating layer is preferably a good conductor of heat and can stand substantial mechanical stresses. During penetration of the electrode 60 into the upper side of the sheet 40, the underside of the zone 68a abuts against the top surface 66 of the base plate 1a.

FIG. 3 illustrates on a larger scale a portion of the structure shown in FIG. 2. The lower part of the electrode 60 has penetrated into the plasticized material of the zone 68a. The pressure which is transmitted to the electrode 60 by the yoke 22, carriers 53, 57 and springs 55, 58, combined with short-lasting intensive heating of the electrode, insures that the lower part of the electrode penetrates well into the plasticized material of the zone 68a so that the remainder of the sheet is connected to the resulting disk-shaped blank 68 only by way of a rather thin web (in zone 68a) disposed between the lower end surface of the electrode 60 and the top surface 66 of the base plate 1a. The thickness of the web in the weakened zone 68a is indicated at C. The width of the web in the zone 68a corresponds to the distance between the internal and external surfaces 62, 63 of the lower part of the electrode 60. The electrode 60 is preferably cooled, at least immediately after it reaches the lower end position shown in FIG. 3, whereby the plasticized material of the weakened zone 68a sets and adheres to the surfaces 62, 63 as well as to the lower edge surface of the electrode. If desired, the inner carrier 57 can be provided with cooling ribs or fins to accelerate the cooling action; this inner carrier constitutes a means for cooling the electrode 60 when the latter has penetrated into the sheet 40. In the next stage of a cycle, the upper holder 28 is moved downwardly with reference to the arrested inner carrier 57 and electrode 60 whereby the female mirror frame portion 52 engages the disk-shaped blank 68 within the confines of the electrode 60 and causes the marginal portion of the blank to flex downwardly in a manner as shown in FIG. 3 by broken lines. This causes the blank 68 to be torn away and to thus become separated from the internal annular surface 62 of the lower part of the electrode 60. The annular surface surrounding the marginal portion of the blank 68 is shown at 64. The numeral 67 denotes the internal surface of the sheet 40 above the weakened zone 68a. Further downward movement of the upper holder 28 causes the blank 68 to tear at the lower end of the surface 62 so that it becomes separated from the zone 68a (see FIG. 4). The resulting initial gap is shown at 65. Such separation of the blank 68 from the remainder of the sheet 40 can be completed by exertion of a relatively small force because the sheet is weakened in zone 68a. Furthermore, the weakened zone is clamped between the lower edge surface of the electrode 60 and the top surface 66 so that the separation of the blank 68 is predictable and is completed without the formation of irregularities along the lower part of the annular surface 64 of the blank 68. The electrode 60 continues to clamp the zone 68a to the top surface 66 of the base plate 1a during assembly of the mirror, i.e., during introduction of the upper mirror frame portion 52 into the lower mirror frame portion 51. Thus, the sheet 40 cannot interfere with introduction of frame portion 52 into the frame portion 51. The properly assembled portions 51, 52 then form an annular frame of a mirror which further includes the blank 68; the marginal portion of such blank is automatically clamped between the portions 51, 52 when the upper holder 28 reaches the lower end of its stroke, namely, when the eccentric pin 24 on the disk 25 reaches its lower end position.

The operation of the means for moving the yoke 22 (motor 26) is synchronized with operation of the driving unit 12 for the advancing rolls 9, 10 in such a way that the yoke 22 is held in upper end position when the unit 12 advances the sheet 40 by a step so as to place a fresh portion of the sheet 40 into the space between the holders 50, 28 which respectively support fresh mirror frame portions 51, 52. Such mirror frame portions can be introduced into the apparatus by hand or by an automatic or semiautomatic feeding assembly of any known design. It is to be noted that the apparatus further comprises a substantially ring-shaped stripping or disengaging member 70 (FIG. 1) which causes the zone 68a and the adjoining portion of the sheet 40 to become separated from the electrode 60 when the yoke 22 causes the intermediate carrier 53 to lift the inner carrier 57 to the position shown in FIG. 1. This enables the rolls 9, 10 to advance the sheet 40 by a step when the parts 22, 53, 57 assume the positions shown in FIG. 1. If desired, the electrode 60 can heat and plasticize the adjoining portion of the sheet 40 before the yoke 22 is moved upwardly so as to facilitate the separating or disengaging action of the stripping means 70.

Figure 5:
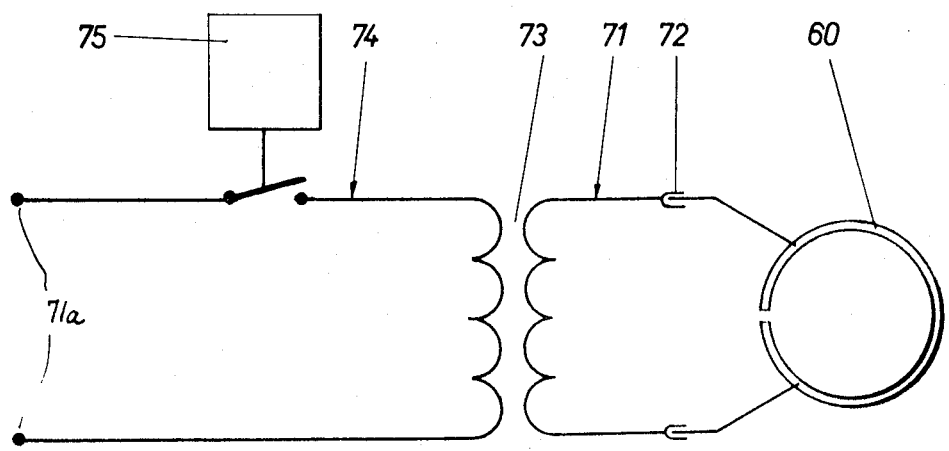
FIG. 5 is a schematic view of the electric heating means for the electrode in the apparatus of FIG. 1.

FIG. 5 illustrates an electrical heating device for the electrode 60. The circuit of this heating device comprises a transformer 73 whose secondary winding 71 is connected with terminals 72 of the electrode 60 and whose primary winding 74 is in circuit with an energy source 71a (e.g. an outlet for 220 volt 50 kHz. current). The primary winding 74 is in series with a suitable timer 75 which can complete the circuit of the primary winding at desired intervals and for desired periods of time to insure satisfactory heating action. The electrode 60 constitutes a resistor which is heated in response to flow of current through the secondary winding 71.

A feature of the improved apparatus is that the dimensions A', B' (FIG. 2) can be kept to a minimum. This results in reduced waste in sheet material and renders it unnecessary to subject the blank 68 to a secondary treatment (trimming) prior to assembly with the mirror frame portions 51, 52.

Figure 8:
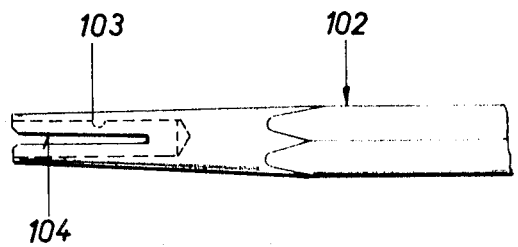
FIG. 8 is an enlarged fragmentary plan view of the handle shown in FIG. 6.
Figure 9:
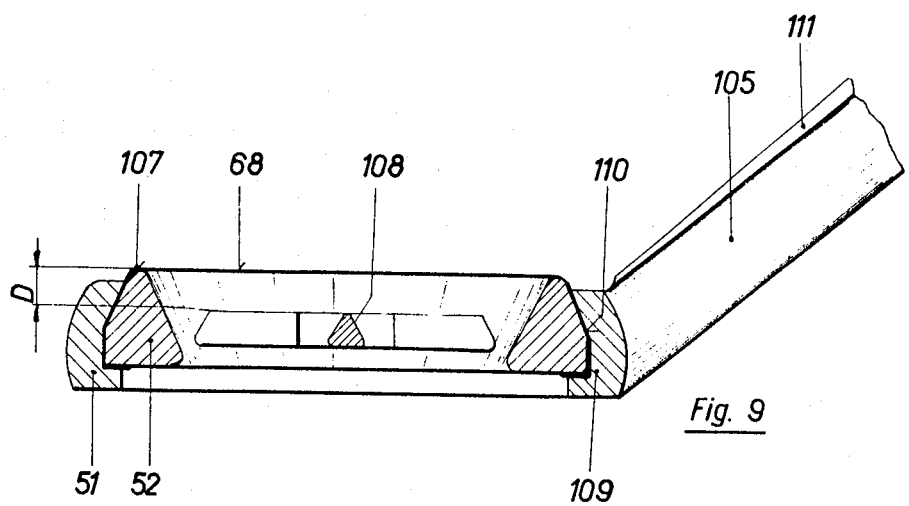
FIG. 9 is an enlarged longitudinal sectional view of the mirror, substantially as seen in the direction of arrows from the line IX—IX of FIG. 7.

FIGS. 6 to 9 illustrate the details of a dentist's mirror 101 which includes the frame portions 51, 52 and the blank 68. The mirror 101 is attached to an elongated handle 102 of customary shape. The mirror 101 itself includes the frame portions 51, 52, the blank 68 and an extension or stem 105 which is receivable in a recess 103 provided in one end portion of the handle 102. The recessed end portion of the handle 102 is slotted, as at 104 to enhance its resiliency and to facilitate insertion of the stem 105. The latter is preferably provided with longitudinally extending ribs 111 each of which is received in one of the slots 104. The slots 104 and the ribs 111 thus prevent rotation of the mirror 101 with reference to the handle 102. As best shown in FIG. 9, the male frame portion 52 includes a ring-shaped element which is reinforced by radially inwardly extending stiffening ribs or spokes 108. The male mirror frame portion 52 is stiffer than the female portion 51 and its external diameter exceeds somewhat the internal diameter of the portion 51 so that the latter undergoes at least some elastic expansion and that the marginal portion of the blank 68 is tightly clamped between the frame portions 51, 52 when these frame portions are assembled in a manner as shown in FIG. 9, i.e., when the portion 52 is a press-fit in the portion 51. The portion 51 has a ring-shaped lip 109 which is preferably folded over and thus overlaps the adjoining end face of the male portion 52 and the marginal portion of the blank 68 to thereby insure that the male portion 52 cannot be withdrawn from the female portion 51 and to further insure an even more reliable stretching and clamping action upon the blank. The apparatus of FIG. 1 can be provided with upsetting means which automatically deforms the lip 109 radially inwardly so that it overlaps the rear end face of the male portion 52 when the ram 28 reaches its lower end position. The front part of the female portion 51 is formed with a conical internal surface 110 which tapers away from the lip 109 and abuts against a complementary conical external surface of the male portion 52 when the latter is properly received in the portion 51. The internal surface 110 insures that the male portion 52 cannot be propelled forwardly beyond the front end of the passage in the female portion 51. The male portion 52 extends forwardly beyond the female portion 51 and has a rounded ring-shaped crest 107 which is adjacent to the inner side of the blank 68. The marginal portion of the blank 68 extends from the crest 107, along the conical surface 110 and into the gap between the lip 109 and the rear end face of the male portion 52. The outer side of that portion of the blank 68 which is located within the confines of the crest 107 constitutes a mirror surface. The inner side of such central portion of the blank 68 is spaced from the spokes 108 by a distance D; this insures that the central portion of the blank 68 is heated or cooled to the same extent from both sides to reduce the likelihood of fogging. The exposed reflecting side of the blank 68 can be readily cleaned by wiping because the crest 107 extends beyond the front end of the female frame portion 51. The spokes or ribs 108 are preferably of triangular cross-sectional outline and are positioned in such a way that one of their apices is adjacent to the inner side of the central portion of the blank 68. This further enhances circulation of air at the inner side of the blank and insures equal heating or cooling at both sides which reduces the likelihood of fogging. The likelihood of such fogging is further reduced by the fact that the central portion of the blank 68 is not immediately adjacent to any heat-storing part or parts. Furthermore the spokes 108 protect the inner side of the blank against damage, for example, by the tongue or by a tooth of the patient. The so-called cord friction is a phenomenon which develops due to the fact that the female frame portion 51 exerts a radially inwardly oriented compressive stress on the male frame portion 52; such friction insures proper retention of the blank 68 in the position shown in FIG. 9 and is particularly effective at an angle of about 180 degrees.

Figure 10:
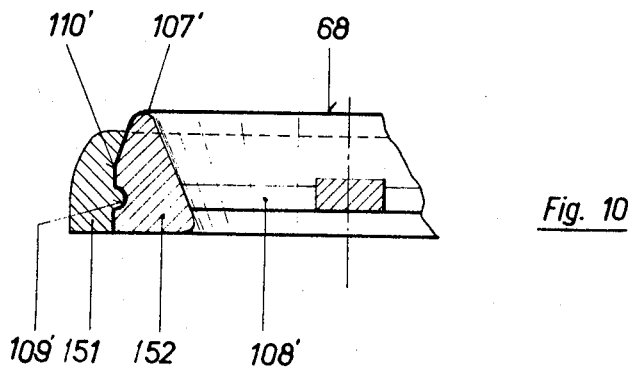
FIG. 10 is a similar sectional view of a slightly modified mirror.

FIG. 10 illustrates a portion of a slightly modified mirror which includes a blank 68 and two annular mirror frame portions 151, 152. The manner in which the blank 68 overlaps the crest 107' of the frame portion 152 is the same as shown in FIG. 9. One of these frame portions, for example, the inner or male frame portion 152, is provided with at least one annular external groove which accommodates an internal bead or protuberance 109' on the frame portion 151 to thus prevent accidental separation of the portions 151, 152. The bead 109' and the corresponding groove replace the lip 109 of the frame portion 51 shown in FIG. 9. Thus, the lip 109 can be dispensed with and the rear end face of the frame portion 151 can be flush with the rear end face of the frame portion 152. The numeral 110' denotes an internal conical surface of the frame portion 151 which prevents expulsion of the frame portion 152 forwardly and beyond the front end of the frame portion 151. The male frame portion 152 is provided with ribs or spokes 108' of rectangular cross-sectional outline. The marginal portion of the blank 68 is draped around the bead 109' and is thus properly clamped between the frame portions 151, 152.

Figure 6:
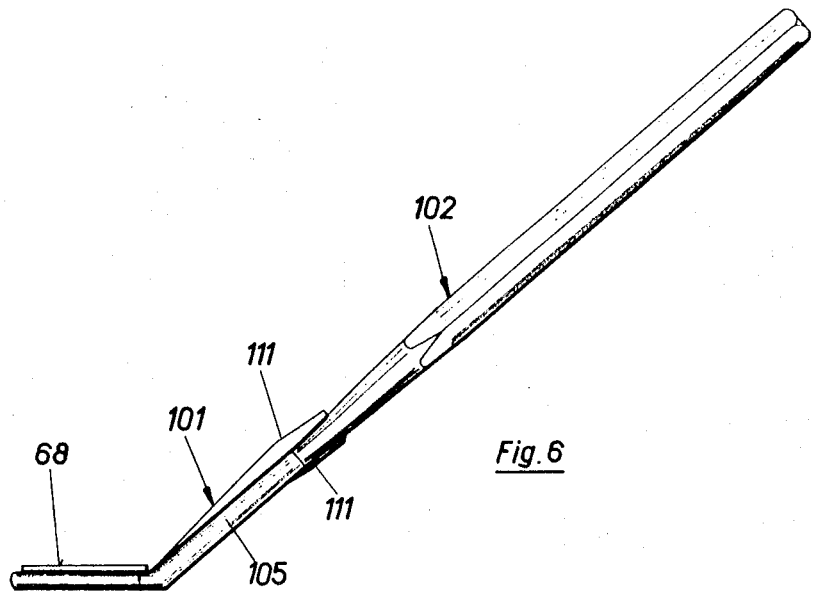
FIG. 6 is a side elevational view of a mirror which can be assembled in the apparatus of FIG. 1 and which is shown connected to an elongated handle to form therewith a structure suited for use by dentists or for analogous purposes.
Figure 7:
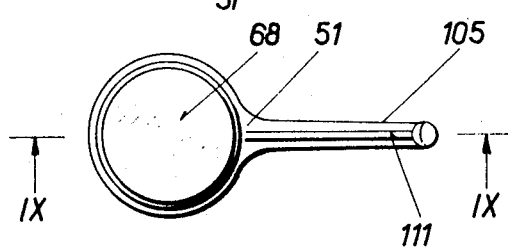
FIG. 7 is a plan view of the mirror.

If desired, the lower axial end of the male frame portion 52 or 152 (as viewed in FIG. 9 or 10) can be provided with a bottom plate which prevents penetration of dust, dirt or other foreign matter to the inner side of the respective blank 68. Such bottom plate also enhances the appearance of the mirror. The manner in which the mirror including the portions 151, 152 and blank 68 of FIG. 10 is separably connected to a suitable handle is preferably the same as shown in FIGS. 6 and 8.

The unit 12 is only responsible for advancing stepwise the sheet 40. By advancing the sheet 40, the lever 5 is advanced to its forward position (indicated by dotted lines) in which it contacts a switch (not shown) which starts the motor 3. The motor 3 turns the reel 2 until the lever 5 reaches its rear position; the lever 5 then contacts a second switch (not shown) which interrupts the electric circuit of the motor 3.

The sheet 40 consists of polyester. Its thickness is preferably between 5 and 20 microns. If the sheet 40 is used for the production of dental mirrors, a layer of aluminum is vaporized upon it.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims:

1. A method of separating blanks from sheets of thermoplastic material, comprising the steps of holding a sheet of thermoplastic material whose dimensions exceed the dimensions of said blank in tensioned condition in a plane; applying pressure to one side of said sheet by means of a tubular electrode having an inner periphery of an outline corresponding to the periphery of the desired blank; shortly heating said electrode so that the latter, applied under pressure to said sheet, will soften a portion of the sheet and partly penetrate into the latter along a zone corresponding to the periphery of the desired blank so as to partly separate the blank from the remainder of said sheet and to form about the periphery of said blank a weakened portion in said sheet while maintaining said partly separated blank connected to said sheet; subsequently cooling said electrode so that the partly separated blank will adhere to said electrode; and tearing the blank along the weakened portion thereof from the remainder of said sheet and from said electrode during the following operational step carried out on said blank.

2. A method as defined in claim 1, wherein said following operational step comprises the step of clamping a peripheral portion of the blank between two complimentary surfaces of a pair of annular members, one of which is moved through said hollow electrode, while moving the blank and the electrode relative to each other in a direction substantially normal to said plane.

3. A method as defined in claim 1, wherein the electrode penetrates during heating thereof into said sheet only a fraction of the thicknes of the latter.

4. A method as defined in claim 1, wherein said sheet is an elongated sheet and including the steps of moving the electrode after tearing the blanks therefrom to a position above said plane; feeding the elongated sheet in longitudinal direction for a distance greater than the dimension of the blank in this direction; and repeating the steps set forth in claim 1.

References Cited

UNITED STATES PATENTS

| 1,181,262 | 5/1916 | Schoch et al. | 29—509 |
| 1,282,612 | 10/1918 | Massey | 29—413 X |
| 1,958,829 | 5/1934 | Lewin, Jr. | 29—413 X |
| 2,167,734 | 8/1939 | Zonino | 225—2 |
| 2,789,640 | 4/1957 | Belden | 225—2 X |
| 2,982,456 | 5/1961 | Hsu et al. | 225—2 |
| 3,240,851 | 3/1966 | Scalora | 264—163 X |
| 3,245,294 | 4/1966 | Butter et al. | 83—16 |
| Re 26,413 | 6/1968 | Keyes | 264—92 X |

JOHN F. CAMPBELL, Primary Examiner

R. J SHORE, Assistant Examiner

U.S. Cl. X.R.

83—16; 225—2; 264—163